United States Patent Office 3,829,473
Patented Aug. 13, 1974

3,829,473
γ,γ-DIARYL-α,β-DIHALOCROTONIC ACIDS
Vaclav Jelinek, deceased, late of Prague, Czechoslovakia, by Vera Jelinkova and Vaclav Jelinek, heirs, Prague, Miroslav Semonsky, Prague, Jiri Hartl, Bratislava, and Alois Borovansky, Brno, Czechoslovakia, assignors to SPOFA, United Pharmaceutical Works, Prague, Czechoslovakia
No Drawing. Filed Nov. 18, 1970, Ser. No. 90,881
Claims priority, application Czechoslovakia, Nov. 18, 1969, 7,603/69
Int. Cl. C07c 63/60
U.S. Cl. 260—515 A                    11 Claims

ABSTRACT OF THE DISCLOSURE

Novel therapeutic compounds of the γ,γ-diaryl-α,β-dihalocrotonic acid type specifically the dichloro and dibromo compounds and processes for the production thereof.

---

This invention relates to new γ,γ-diaryl-α,β-dihalogencrotonic acids having the general formula as indicated below (I).

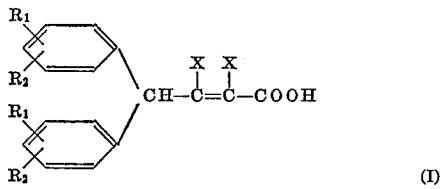

wherein X is a chlorine or bromine atom, $R_1$ is a fluorine or bromine atom, or a methyl, ethyl, or cycloalkyl radical having 5 to 6 carbon atoms, and $R_2$ is a hydrogen atom or methyl radical, and to a process for producing same, and to the use of such compounds as therapeutic agents.

The novel acids having the aforementioned general formula were synthesized during an investigation of combinations having predetermined antineoplastic effects, that is as a continuation of the previously reported research work by V. Ettel, M. Semonsky, V. Zikan, Chem. list 46, 232, 1952, which work was concerned with the synthesis of the γ,γ-diphenyl-α,β-dichloro- and γ,γ-bis-(p-chlorophenyl)-α,β-dichlorocrotonic acid. Both acids were, however, in the indicated field, completely ineffective.

In accordance with the invention the production of the new acids is carried out by reacting mucochloric or mucobromic acid with a substituted benzene of the general formula (II)

wherein $R_1$ and $R_2$ have the same meaning as in formula I, in a quantity of at least two molar equivalents, in the presence of anhydrous aluminum chloride, at temperatures in the range of 10° C. up to the boiling temperature of the reaction mixture.

The excess aromatic reactant, that is the substituted benzene of general formula II, when used in a quantity greater than two mole equivalents, serves simultaneously as reaction medium and reactant and the excess can be recovered to a great degree. In some cases, in particular when the mucohalogen acid used is poorly dissolved in the aromatic reaction components, it is advantageous, to use in lieu of a large excess of these compounds, an inert solvent medium which readily dissolves the mucohalogen acid, for example, 1,2-dichlorethane.

The condensation of the mucohalogen acid with the substituted benzene of general formula II in the presence of anhydrous aluminum chloride occurs with production of hydrogen chloride or hydrogen bromide and is only moderately exothermic. After the reaction is complete as indicated by cessation of the formation of hydrogen chloride or hydrogen bromide the reaction mixture is decomposed by pouring it into an ice-hydrochloric acid mixture. After stirring the decomposed reaction mixture with a water immiscible low boiling solvent for example, chloroform, the organic phase is separated. Low-boiling components are separated by distillation and the remainder is permited to crystallize. The separated product is dried under vaccum. By working up the mother liquor it is possible to obtain a further fraction of the product. The yield of γ,γ-diaryl-α,β-dihalogencrotonic acids in most cases is about 90% of the theoretical yield.

The γ,γ-diaryl-α,β-dihalogencrotonic acids of the general formula I, in particular those which are substituted in the benzene nucleus with alkyl radicals, have a significant antineoplastic, in other words, therapeutic, effect with experimental animals having a certain type of experimental tumor, and their toxicity is relatively low. It is especially significant that the therapeutic effect of the aforementioned acids is also developed when they are administered orally.

Thus, for example, the γ,γ-di-4-ethylphenyl-α,β-dibromo-crotonic acid was tested on mice, of the race H, having transplanted Ehrlich-ascites tumor, said acid being administered beginning on the 3rd day after the tumor has been transplanted, in a daily dose of 100 mg./kg. of weight for 12 days (except Saturday and Sunday). When thus used and as compared with a non-treated control group, the test compound delays the tumor growth by about 30% and increases the survival of the treated animals by 26%. Mice, of the race H, having a carcinoma of the type tumor Kr 2, when treated with the aforementioned acid, in a daily dose of 50 mg./kg. of weight and otherwise maintained under the same conditions, showed a delay or retardation of the tumor growth by about 36%, and an increase in the survival of the treated animals by about 42%. The same type of animals having a tumor Sarkom S 37, when being treated with the aforementioned material, in a dose of 50 mg./kg. of weight per day, and otherwise maintaining the same experimental conditions, showed a delay or retardation in tumor growth of about 12% and produced an increase of survival of the treated animals by 28%.

In comparison with these results there was noted complete ineffectiveness with the γ,γ-di-4-ethylphenyl-α,β-dibromocrotonic acid with rats having a transplanted Yoshida-Ascitessarcoma in doses of 50 to 100 mg./kg. per day by weight started on the second day after the tumor transplant, and otherwise with the same hereinbefore-described experimental conditions. The acute toxicity (LD 50) determined with mice after oral administration amounts to about 800 mg./kg.

There can not as yet be given a categorical and final explanation concerning the mechanism of the antineoplastic effect of the γ,γ-diaryl-α,β-dihalogencrotonic acids of the general formula I as such effect is disclosed herein. What is notable, however, is the determination that the acids in vitro cause a retardation on the folic acid reductase otherwise called "folatreductase" and tetrahydro folic acid formylase. For example the γ,γ-di-4-ethylphenyl-α,β-di-bromocrotonic acid causes, in a concentration of 25 µg./l. ml. in the incubation medium, about a 73% retardation of the first, and in a concentration of 120 µg./l. ml. about a 50% retardation of the second enzyme.

EXAMPLE 1

γ,γ-di-4-methylphenyl-α,β-dichlorocrotonic acid

To a mixture of 165 g. toluene and 40 g. aluminum chloride there is added 33 g. of finely ground mucochorine acid under anhydrous conditions and the mixture is stirred at a temperature of 20-25° C., for 20 minutes. The stirring of the reaction mixture is continued at the same temperature for one hour. The reaction mixture is allowed to stand for 24 hours after which it is poured into a mixture of 250 g. of chopped ice and 75 ml. of concentrated hydrochloric acid. After addition of 200 ml. chloroform the mixture is shaken vigorously. After the mixture has settled, the organic phase is separated and dried with water free sodium sulfate. The low boiling portions are distilled using the vacuum of a water jet pump. The residue is permitted to crystallize. The yield of the raw product amounts to 63 g. After recrystallization first in aqueous methanol and thereafter in dilute acetic acid there is obtained a pure product, m.p. 178–179.5° C.

EXAMPLE 2

γ,γ-di-4-ethylphenyl-α,β-dibromocrotonic acid

Into a mixture of 40 g. ethyl benzene and 8 g. aluminum chloride there is added under the same conditions as set forth in Example 1, 10 g. of mucobromine acid. The reaction mixture is stirred for one hour. After working up the reaction mixture as set forth in Example 1, there is obtained 13.5 g. of a raw product which after recrystallization in chloroform is purified. m.p. 137–138° C.

EXAMPLE 3

γ,γ-di-4-cyclohexylphenyl-α,β-dichlorocrotonic acid

Into a mixture of 58 g. cyclohexylbenzene, 8.0 g. aluminum chloride and 50 ml. 1,2-dichlorethane there is added, under the same conditions as set forth in Example 1, 6.6 g. of mucochlorine acid. The reaction mixture is stirred for 2.5 hours at a temperature of 70 to 75° C. After work up as in Example 1, with the only exception that dichloroethane is used instead of chloroform the raw product in a yield of 88%. It is possible by means of recrystallization with acetic acid to purify it. m.p. 163–165° C.

In the same manner as the aforedescribed examples the following combinations were obtained:

γ,γ-di-4-ethylphenyl-α,β-dichlorocrotonic acid, m.p. 133.5–135 C./(aqueous acetic acid).

γ,γ-di-3,4-dimethylphenyl-α,β-dichlorocrotonic acid, m.p. 168–170° C./(aqueous acetic acid).

γ,γ-di-2,4-dimethylphenyl-α,β-dichlorocrotonic acid, m.p. 174.5–176° C./(aqueous acetic acid).

γ,γ-di-2,5-dimethyl-phenyl-α,β-dichlorocrotonic acid m.p. F. 192–193.5° C. (acetic acid).

γ,γ-di-4-fluorphenyl-α,β-dichlorocrontonic acid, m.p. 166–168° C. (acetic acid).

γ,γ-di-4-brominephenyl-α,β-dichlorocrontonic acid, m.p. 182–183.5° C. (acetic acid).

γ,γ-di-4-methylphenyl-α,β-dibromocrotonic acid, m.p. 167–169° C. (aqueous acetic acid).

γ,γ-di-3,4-dimethylphenyl-α,β-dibromocrotonic acid, m.p. 191–193° C. (acetic acid).

γ,γ-di-2,4-dimethylphenyl-α,β-dibromocrotonic acid, m.p. 206–208° C. (aqueous acetic acid).

γ,γ-di-4-fluorphenyl-α,β-dibromocrotonic acid, m.p. 149–151° C. (acetic acid).

What is claimed is:

1. γ,γ-diaryl-α,β-dihalocrotonic acid having the general formula I

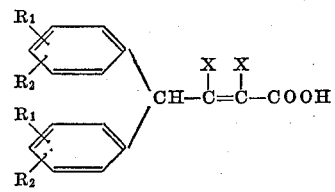

(I)

wherein X is a chlorine- or bromine atom, $R_1$ is a bromine atom, a fluorine atom or a methyl, ethyl or cycloalkyl radical having 5 to 6 carbon atoms, and $R_2$ is a hydrogen atom or a methyl radical.

2. γ,γ-bis-(4-ethylphenyl)-α,β-dibromocrotonic acid.
3. γ,γ-bis-(4-methylphenyl)-α,β-dichlorocrotonic acid.
4. γ,γ-bis-(4 - cyclohexylphenyl)-α,β-dichlorocrotonic acid.
5. γ,γ-bis-(4-ethylphenyl)-α,β-dichlorocrotonic acid.
6. γ,γ-(4,4-dimethylphenyl)-α,β-dichlorocrotonic acid.
7. γ,γ-bis-(2,4 - dimethylphenyl)-α,β-dichlorocrotonic acid.
8. γ,γ-bis-(2,5 - dimethylphenyl)-α,β-dichlorocrotonic acid.
9. γ,γ-bis-(4-methylphenyl)-α,β-dibromocrotonic acid.
10. γ,γ-bis-(3,4 - dimethylphenyl)-α,β-dibromocrotonic acid.
11. γ,γ-bis-(2,4 - dimethylphenyl)-α,β-dibromocrotonic acid.

References Cited

Ettel et al.: Chem. Abstracts, vol. 47 (1952), p. 6903.

JAMES A. PATTEN, Primary Examiner

U.S. Cl. X.R.

424—317